us010862908B2

(12) United States Patent
Nogin et al.

(10) Patent No.: US 10,862,908 B2
(45) Date of Patent: Dec. 8, 2020

(54) SYSTEM AND METHOD FOR CONSENSUS ORDERING OF BROADCAST MESSAGES

(71) Applicant: HRL Laboratories, LLC, Malibu, CA (US)

(72) Inventors: Aleksey Nogin, Fresno, CA (US); Joshua D. Lampkins, Gardena, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/450,170

(22) Filed: Jun. 24, 2019

(65) Prior Publication Data
US 2020/0084159 A1    Mar. 12, 2020

Related U.S. Application Data

(63) Continuation-in-part of application No. 16/433,928, filed on Jun. 6, 2019.
(Continued)

(51) Int. Cl.
*H04L 29/06* (2006.01)
*H04L 12/911* (2013.01)
(Continued)

(52) U.S. Cl.
CPC ........ *H04L 63/1416* (2013.01); *H04L 47/783* (2013.01); *H04L 47/806* (2013.01);
(Continued)

(58) Field of Classification Search
CPC ............ H04L 63/1416; H04L 63/1425; H04L 63/0421; H04W 12/1202
See application file for complete search history.

(56) References Cited

U.S. PATENT DOCUMENTS 6,651,242 B1 * 11/2003 Hebbagodi ........... G06F 9/4881
714/2
6,671,821 B1 * 12/2003 Castro ................... G06F 21/577
714/4.3
(Continued)

FOREIGN PATENT DOCUMENTS

WO    WO2017190794    11/2017

OTHER PUBLICATIONS

A. Mostéfaoui and M. Raynal, "Intrusion-Tolerant Broadcast and Agreement Abstractions in the Presence of Byzantine Processes," in IEEE Transactions on Parallel and Distributed Systems, vol. 27, No. 4, pp. 1085-1098, Apr. 1, 2016. (Year: 2016).*
(Continued)

*Primary Examiner* — Kari L Schmidt
(74) *Attorney, Agent, or Firm* — Tope-McKay & Associates

(57) ABSTRACT

The system is directed to a plurality of nodes in a network and a process by which the nodes reach a consensus ordering of broadcast messages. For example, one or more nodes proceed by agreeing on an order of two or more broadcast message derived events A and B. If a node sees event A longer than a time period (T6) before seeing event B, then the node outputs "A consensus-before B" as a consensus broadcast ordering. If the node sees the event A and not the event B after waiting at least T6, then the node outputs "A consensus-before B" as a consensus broadcast ordering. However, if the node sees both events A and event B within T6, then the node broadcasts a request for a vote on message ordering, executes a consensus broadcast reception protocol for the votes, and makes an ordering decision based on the votes received.

12 Claims, 5 Drawing Sheets

Related U.S. Application Data

(60) Provisional application No. 62/716,680, filed on Aug. 9, 2018, provisional application No. 62/722,754, filed on Aug. 24, 2018.

(51) Int. Cl.
*H04L 12/927* (2013.01)
*H04W 12/12* (2009.01)

(52) U.S. Cl.
CPC ...... *H04L 63/0421* (2013.01); *H04L 63/1425* (2013.01); *H04W 12/1202* (2019.01)

(56) References Cited

U.S. PATENT DOCUMENTS

| | | | |
|---|---|---|---|
| 8,069,216 B2* | 11/2011 | He | H04L 63/1416 709/207 |
| 8,700,906 B2 | 4/2014 | Kamara | |
| 9,449,177 B1 | 9/2016 | El Defrawy | |
| 9,568,943 B1* | 2/2017 | Carman | G06F 11/2094 |
| 9,846,596 B1 | 12/2017 | Nogin | |
| 10,042,881 B1 | 8/2018 | Hsieh et al. | |
| 10,146,792 B1* | 12/2018 | Dobrek | G06Q 20/0655 |
| 2013/0010781 A1* | 1/2013 | Gresset | H04J 3/0605 370/350 |
| 2017/0132257 A1 | 5/2017 | Baird, III | |
| 2018/0101560 A1* | 4/2018 | Christidis | G06F 16/215 |
| 2018/0157558 A1* | 6/2018 | Karame | G06F 11/2058 |
| 2018/0241747 A1 | 8/2018 | Tanaka | |
| 2018/0267539 A1* | 9/2018 | Shih | G05D 1/0295 |
| 2018/0341930 A1* | 11/2018 | Moir | G06Q 20/0655 |
| 2018/0343275 A1* | 11/2018 | Moon | H04L 63/20 |
| 2019/0020729 A1* | 1/2019 | Chen | H04L 9/0637 |
| 2019/0068380 A1* | 2/2019 | Tang | H04L 9/0637 |
| 2019/0251199 A1* | 8/2019 | Klianev | G06F 16/2365 |
| 2019/0287099 A1* | 9/2019 | Tan | G06Q 20/3827 |
| 2019/0347628 A1* | 11/2019 | Al-Naji | G06Q 20/0658 |
| 2019/0362072 A1* | 11/2019 | Kesarwani | G06F 21/56 |
| 2020/0013025 A1* | 1/2020 | Verma | G06Q 20/06 |
| 2020/0014703 A1* | 1/2020 | Furukawa | H04L 63/126 |
| 2020/0242354 A1* | 7/2020 | Ligman | G06K 9/00577 |

OTHER PUBLICATIONS

H. Moniz, N. F. Neves and M. Correia, "Byzantine Fault-Tolerant Consensus in Wireless Ad Hoc Networks," in IEEE Transactions on Mobile Computing, vol. 12, No. 12, pp. 2441-2454, Dec. 2013 (Year: 2013).*

Miller, Andrew, et al. "The honey badger of BFT protocols." Proceedings of the 2016 ACM SIGSAC Conference on Computer and Communications Security.pp. 31-42. 2016. (Year: 2016).*

Duan, Sisi, Michael K. Reiter, and Haibin Zhang. "BEAT: Asynchronous BFT made practical." Proceedings of the 2018 ACM SIGSAC Conference on Computer and Communications Security. pp. 2028-2041. 2018. (Year: 2018).*

G. Bracha. An asynchronous [(n-1)/3]-resilient consensus protocol. In T. Kameda, J. Misra, J. Peters, and N. Santoro, aditors, Proceedings of the Third Annual ACM Symposium on Principles of Distributed Computing, Vancouver, B. C., Canada, Aug. 27-29, 1984, pp. 154-162. ACM, 1984.

Cristian Tapus, Aleksey Nogin, Jason Hickey, and Jerome White. A Simple Serializability Mechanism for a Distributed Objects System. In David A. Bader and Ashfaq A. Khokhar, editors, Proceedings of the 17th International Conference on Parallel and Distributed Computing Systems (PDCS-2004). International Society for Computers and Their Applications (ISCA), pp. 1-6, 2004.

G. V. Chockler, N. Huleihel, and D. Dolev. An adaptive totally ordered multicast protocol that tolerates partitions. In Proceedings of the seventeenth annual ACM symposium on Principles of distributed computing, pp. 237-246. ACM Press, 1998.

Paul D. Ezhilchelvan, Raimundo A. Mac/\edo, and Santosh K. Shrivastava. Newtop: a fault-tolerant group communication protocol. In Proceedings of the 15th International Conference on Distributed Computing Systems (ICDCS'95), p. 296. IEEE Computer Society, 1995.

L. E. Moser, P. M. Melliar-Smith, D. A. Agarwal, R. K. Budhia, and C. A. Lingley-Papadopoulos. Totem: a fault-tolerant multicast group communication system. Commun. ACM, 39(4): pp. 54-63, 1996.

Peter Bogetoft, et al., Secure multiparty computation goes live. In Roger Dingledine and Philippe Golle, editors, Financial 16 Cryptography and Data Security, vol. 5628 of Lecture Notes in Computer Science, pp. 325-343. Springer Berlin Heidelberg, 2009.

Dan Bogdanov, Sven Laur, and Jan Willemson. Sharemind: A framework for fast privacy-preserving computations. In Sushil Jajodia and Javier Lopez, editors, Computer Security—ESORICS 2008, vol. 5283 of Lecture Notes in Computer Science, pp. 192-206. Springer Berlin Heidelberg, 2008.

J. Baron, K. El Defrawy, A Nogin, and R. Ostrovsky. An architecture for a resilient cloud computing infrastructure. In Technologies for Homeland Security (HST), 2013 IEEE International Conference on, pp. 390-395, 2013.

Ran Canetti. Universally composable security: A new paradigm for cryptographic protocols. In Proceedings of the 42Nd IEEE Symposium on Foundations of Computer Science, FOCS '01, pp. 136-145, 2001.

Christian Cachin, Klaus Kursawe, Anna Lysyanskaya, and Reto Strobl. Asynchronous verifiable secret sharing and proactive cryptosystems. In Proceedings of the 9th ACM Conference on Computer and Communications Security, CCS '02, pp. 88-97, New York, NY, USA, 2002.

Ivan Damg˚ard and Jesper Buus Nielsen. Scalable and unconditionally secure multiparty computation. In Alfred Menezes, editor, Advances in Cryptology—CRYPTO 2007, vol. 4622 of Lecture Notes in Computer Science, pp. 572-590. Springer Berlin Heidelberg, 2007.

Ivan Damgrd, Marcel Keller, Enrique Larraia, Valerio Pastro, Peter Scholl, and NigelP. Smart. Practical covertly secure mpc for dishonest majority or: Breaking the spdz limits. In Jason Crampton, Sushil Jajodia, and Keith Mayes, editors, Computer Security ESORICS 2013, vol. 8134 of Lecture Notes in Computer Science, pp. 1-18. Springer Berlin Heidelberg, 2013.

Ivan Damgrd, Valerio Pastro, Nigel Smart, and Sarah Zakarias. Multiparty computation from somewhat homomorphic encryption. In Reihaneh Safavi-Naini and Ran Canetti, editors, Advances in Cryptology Crypto 2012, vol. 7417 of Lecture Notes in Computer Science, pp. 643-662. Springer Berlin Heidelberg, 2012.

Amir Herzberg, Stanislaw Jarecki, Hugo Krawczyk, and Moti Yung. Proactive secret sharing or: How to cope with perpetual leakage. In CRYPTO, pp. 339-352, 1995.

A.D. Keromytis, R. Geambasu, S. Sethumadhavan, S.J. Stolfo, Junfeng Yang, A. Benameur, M. Dacier, M. Elder, D. Kienzle, and A. Stavrou. The MEERKATS cloud security architecture. In ICDCSW, pp. 446-450, 2012.

Rafail Ostrovsky and Moti Yung. How to withstand mobile virus attacks (extended abstract). In PODC, pp. 51-59, 1991.

Adi Shamir. How to share a secret. Commun. ACM, 22(11): pp. 612-613, 1979.

Tomas Toft. Primitives and applications for multi-party computation. PhD Thesis. University of Aarhus, Sections 8.1-8.1.4, pp. 49-53, 2007.

Lidong Zhou, Fred B. Schneider, and Robbed Van Renesse. Coca: A secure distributed online certification authority. ACM Trans. Comput. Syst., 20(4): pp. 329-368, 2002.

Notification of Transmittal of International Search Report and the Written Opinion of the International Searching Authority for PCT/US2019/035854; dated Oct. 1, 2019.

International Search Report of the International Searching Authority for PCT/US2019/035854; dated Oct. 1, 2019.

Written Opinion of the International Searching Authority for PCT/US2019/035854; dated Oct. 1, 2019.

Joshua Baron et al., 'An architecture for a resilient cloud computing infrastructure', 2013 IEEE International Conference on Technologies for Homeland Security (HST), May 19, 2016.

(56) References Cited

OTHER PUBLICATIONS

Amos Beimel et al., 'Non-Interactive Secure Multiparty Computation', Advances in Cryptology—CRYPTO 2014, Part II, LNCS 8617, pp. 387-404, Aug. 21, 2014.
Christoph Lucas et al., 'Hybrid-Secure MPC: Trading Information-Theoretic Robustness for Computational Privacy', Proceeding of the 29th ACM SIGACT-SIGOPS symposium on Principles of distributed computing, pp. 219-228, Jul. 28, 2010.
Notification of Transmittal of International Search Report and the Written Opinion of the International Searching Authority for PCT/US2019/038724; dated Oct. 10, 2019.
International Search Report of the International Searching Authority for PCT/US2019/038724; dated Oct. 10, 2019.
Written Opinion of the International Searching Authority for PCT/US2019/038724; dated Oct. 10, 2019.
Mo Liu et al., 'Sequence Pattern Query Processing over Out-of-Order Event Streams', Data Engineering, 2009, ICDE' 2009, IEEE 25th International Conference on, IEEE, Mar. 29, 2009, pp. 784-795.
Vincent Rahli et al., 'A diversified and correct-by-construction broadcast service', 2012 20th IEEE International Conference on Network Protocols (ICNP), Feb. 14, 2013.
Office Action 1 for U.S. Appl. No. 16/433,928, dated May 21, 2020.
George Coulouris, Jean Dollimore, and Tim Kindberg. Distributed Systems: Concepts and Design. Addison-Wesley, fifth edition, Chapter 15, pp. 629-671, and Chapter 17—sec 17.1-17.4, pp. 727-740, (2012).

\* cited by examiner

SYSTEM AND METHOD FOR CONSENSUS ORDERING OF BROADCAST MESSAGES

CROSS-REFERENCE TO RELATED APPLICATIONS

This is a Continuation-in-Part application of U.S. application Ser. No. 16/433,928, filed on Jun. 6, 2019, which is a non-provisional patent application of U.S. Provisional Application No. 62/716,680, filed on Aug. 9, 2018, the entirety of which are hereby incorporated by reference.

This application is ALSO a non-provisional patent application of U.S. Provisional Application No. 62/722,754, filed on Aug. 24, 2018, the entirety of which is hereby incorporated by reference.

GOVERNMENT RIGHTS

This invention was made with government support under contract number HSHQDC-13-C-B0026, issued by Department of Homeland Security. The government has certain rights in the invention.

BACKGROUND OF INVENTION

(1) Field of Invention

The present invention relates to a system and method for multi-party network protocols and, more specifically, to a system and method for implementing a protocol where messages are processed based on a consensus ordering amongst the nodes in the protocol.

(2) Description of Related Art

The present disclosure is related to addressing issues presented when implementing a networking protocol for multiple nodes (e.g., computers or other devices) on a network. In one example, suppose the nodes perform some common tasks using a secure multi-party computation (MPC) protocol. At any point in time, a particular participant may detect that another participant is deviating from the protocol and is therefore malicious. It should be noted that the term "malicious" refers to any reason for the failure to follow the protocol, such as software bug, hardware failure, cyber-attack, etc. At this point, a common approach in MPC implementations is for the party to broadcast a "dispute" message indicating that it is in dispute with the malicious party. Note that a dispute message necessarily indicates that at least one party involved is malicious but does not necessarily indicate which one, as a malicious party could choose to broadcast a dispute message pointing to an honest one.

Some researchers have attempted to address the issues associated with identifying the malicious party or node. By way of example, Tapus et al. attempted to solve this problem in a very different setting by providing a serialization mechanism as opposed to an MPC implementation (see the List of Incorporated Literature References, Literature Reference No. 2). Notably, the work of Tapus et al. uses a protocol with a comparatively higher complexity than is desired in most implementations. Other group communication work concentrates on developing a reliable multicast layer to achieve total order (see Literature Reference Nos. 3 and 4). For the purposes of a filesystem, for example, such an approach is not well fitted due to the lower level of the approach and the possibility of a very large number of multicast groups present in such systems. The control of such ordering should ideally be at a higher level.

In other words, there are systems that address both total order at the application layer and multi-group process membership (see Literature Reference Nos. 5 and 6). Some of these systems assume a hierarchy of the nodes they use to obtain global total ordering in the subgroups. Such methods are heavyweight, as in requiring significant amount of communication and significant delays, even when no nodes are malicious.

Thus, a continuing need exists for a simple and effective protocol that requires very little computational overhead as compared to the prior art.

SUMMARY OF INVENTION

This disclosure is directed to a system and method for consensus ordering of broadcast messages. In various aspects, the system includes a plurality of nodes in a network. Each node has one or more processors and a memory. The memory is a non-transitory computer-readable medium having executable instructions encoded thereon, such that upon execution of the instructions, one or more nodes in the plurality of nodes perform several operations, such as:

agreeing on an order of two or more broadcast message derived events A and B on one or more networks;
  wherein if a node sees event A longer than a predetermined time period (T6) before seeing event B, then outputting "A consensus-before B" as a consensus broadcast ordering;
  wherein if the node sees the event A and not the event B after waiting at least T6, then outputting "A consensus-before B" as a consensus broadcast ordering;
  wherein if the node sees both events A and event B within T6, then:
    broadcasting a request for a vote on message ordering;
    executing a consensus broadcast reception protocol for the votes; and
    making an ordering decision based on the votes received.

In another aspect, one or more nodes further perform an operation of observing, by each node in the network, one or more broadcast message derived events, A and B, in some order, such that upon receipt, the system proceeds to perform the operation of agreeing on an order of two or more message derived events A and B.

In yet another aspect, one or more nodes further perform an operation of broadcasting a dispute message, such that the dispute message is transmitted by a first node to indicate that the first node accuses the second node of failing to follow protocol.

In yet another aspect, one or more nodes further perform an operation of designating a node in the network as a known malicious node, based on a number of other nodes with which the given node has disputes.

In another aspect, the known malicious node is a sensor in a network, where the sensor is isolated from the network such that signals from the sensor are discarded by honest nodes in the network.

In another aspect, the consensus broadcast reception protocol is based on a consensus ordering between a time message derived event A is received and between either the time the sender of the message derived event A became known malicious, or an offset from such time, such that:

if the message derived event A is received "consensus-before" the sender became known malicious, or an offset from such time, then consensus-receive amongst honest nodes an actual value of the message derived event A; or if the sender node becomes known malicious, or an offset from such time is "consensus-before" its network broadcast is received, then consensus-receive amongst the honest nodes a value of zero of the message derived event A.

In another aspect, ordering of the two or more broadcast message derived events A and B modify a shared state, such that a consensus ordering protocols is used to maintain a consistent view of the shared state to ensure that whenever ordering of modifications could result in different end states, honest nodes are notified of which order to use.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors of one or more nodes perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
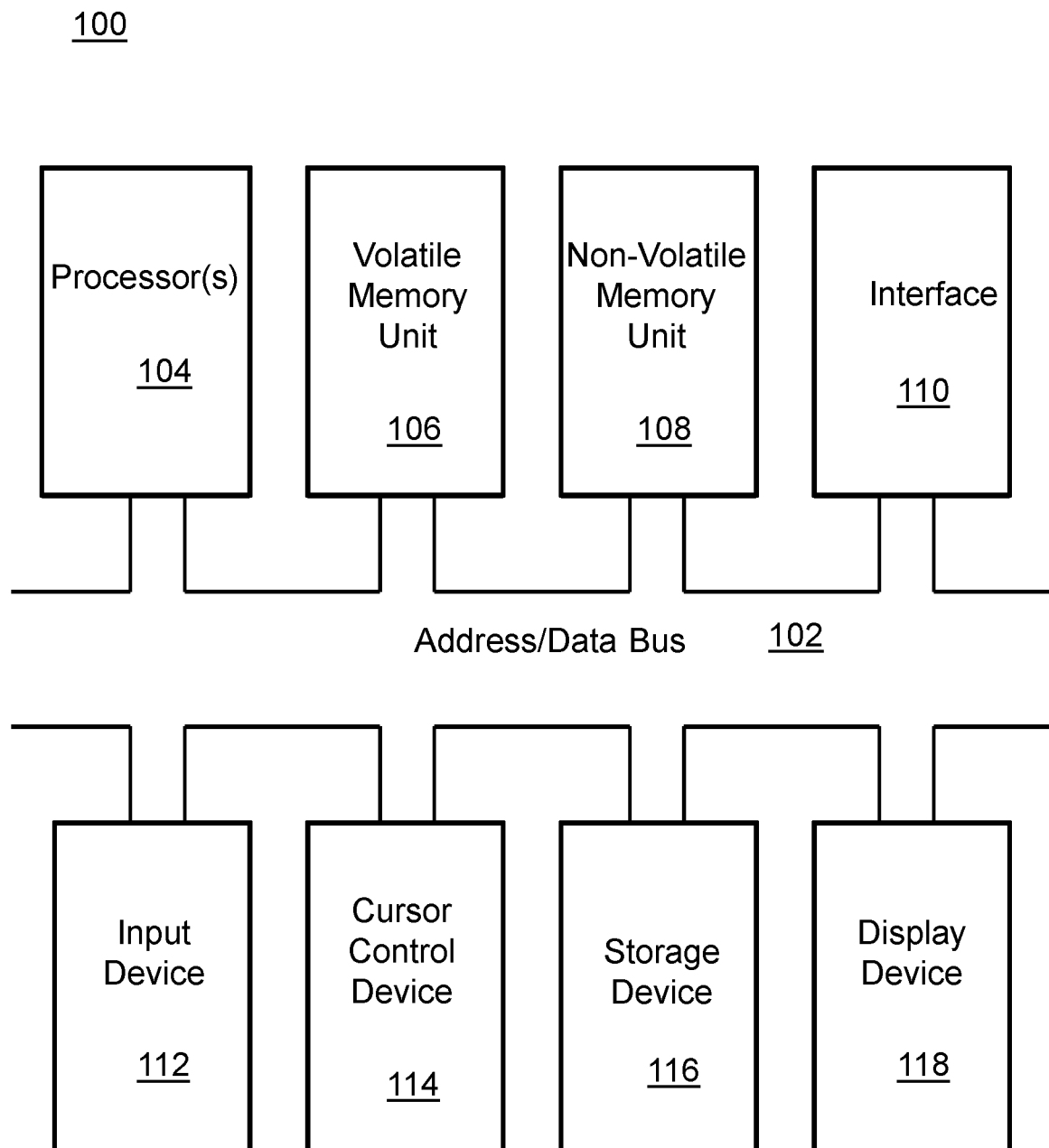
FIG. 1 is a block diagram depicting the components of a system according to various embodiments of the present invention.

The present invention relates to a system and method for multi-party network protocols and, more specifically, to a system and method for implementing a protocol where messages are processed based on a consensus ordering amongst the nodes in the protocol. A non-limiting example of such a protocol that can implement the system is a multi-party network (e.g., multi-party computation (MPC)). Messages are broadcast without any regard to consensus ordering. Once a broadcast message arrives at the recipient, the recipient needs to process it in a consensus order (that is—the correct functionality in some other part of the system depends on making sure that all "honest" recipients of a set of broadcast messages consume them in identical order, even if the order in which the messages initially arrived is potentially different at every recipient).

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. G. Bracha. An asynchronous [(n−1)/3]-resilient consensus protocol. In T. Kameda, J. Misra, J. Peters, and N. Santoro, editors, *Proceedings of the Third Annual ACM Symposium on Principles of Distributed Computing*, Vancouver, B. C., Canada, Aug. 27-29, 1984, pages 154-162. ACM, 1984.

2. Cristian Tapus, Aleksey Nogin, Jason Hickey, and Jerome White. A Simple Serializability Mechanism for a Distributed Objects System. In David A. Bader and Ashfaq A. Khokhar, editors, *Proceedings of the* 17*th International Conference on Parallel and Distributed Computing Systems (PDCS*-2004*)*. International Society for Computers and Their Applications (ISCA), 2004.

3. G. V. Chockler, N. Huleihel, and D. Dolev. An adaptive totally ordered multicast protocol that tolerates partitions.

In *Proceedings of the seventeenth annual ACM symposium on Principles of distributed computing*, pages 237-246. ACM Press, 1998.
4. George Coulouris, Jean Dollimore, and Tim Kindberg. Distributed Systems: Concepts and Design. Addison-Wesley, fifth edition, Chapters 15-17 (2012).
5. Paul D. Ezhilchelvan, Raimundo A. Macêdo, and Santosh K. Shrivastava. Newtop: a fault-tolerant group communication protocol. In *Proceedings of the 15th International Conference on Distributed Computing Systems* (ICDCS'95), page 296. IEEE Computer Society, 1995.
6. L. E. Moser, P. M. Melliar-Smith, D. A. Agarwal, R. K. Budhia, and C. A. Lingley-Papadopoulos. Totem: a fault-tolerant multicast group communication system. Commun. ACM, 39(4):54-63, 1996.

(2) Principal Aspects

Various embodiments of the invention include three "principal" aspects. The first is a system for system. The system is typically in the form of a computer system or several computer systems in a network operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of at least one computer in the system of the present invention is provided in FIG. 1. For example, when implemented in a network with multiple nodes, each node is an independent computer system that communicates with other nodes in the network. Thus, FIG. 1 provides a non-limiting example of at least one of those computer systems 100. Note that the system and method as described herein can be implemented on servers in the cloud as well as desktops. The computer system 100 can be a typical computer or, in other aspects, mobile devices as well as IoT devices (e.g., sensor network), or even a set of control computers on an airplane or other platform that uses the protocol (e.g., a multi-party computation protocol, etc.) for fault tolerance and cybersecurity purposes.

In various embodiments, computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
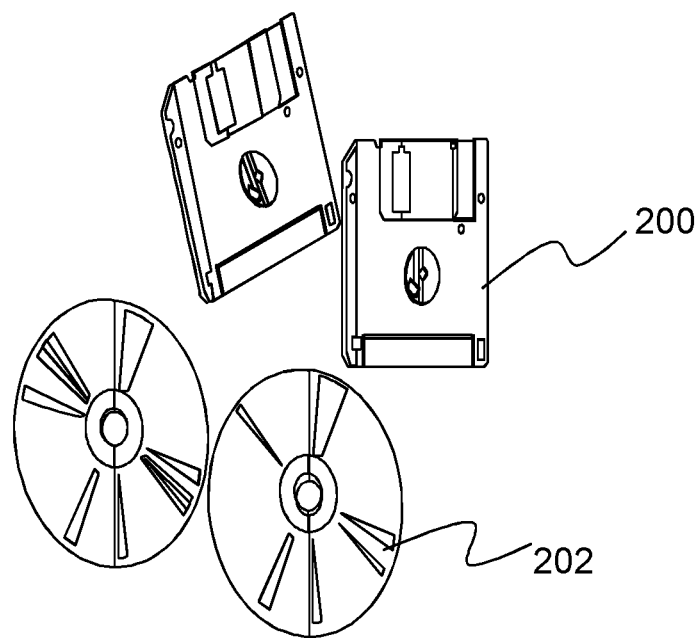
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a networking protocol for multiple nodes (e.g., computer systems or other devices capable of implementing such a protocol) on a network that supports broadcast operations. The broadcast operations are transmissions such that if at least one recipient receives the message, then all recipients participating in the exchange would receive the same message, even if the sender is trying to "cheat". This property can be ensured either by network hardware, such as an Infiniband fabric, or via a separate underlying broadcast subprotocol, such as the Bracha's asynchronous broadcast protocol (see Literature Reference No. 1); where the broadcasts from a given sender are always received in the order they were sent, and where there is a limit on how long a particular broadcast operation can take before it completes.

Further, a setting is assumed where up to t participants (t is a public parameter and for this protocol can be as large as (n−1)/2) can be malicious and violate the protocol in arbitrary manner. The remaining nodes (referred to as "honest") would follow the protocol as defined in this disclosure.

The protocol is designed to allow a global agreement (among non-malicious nodes or "honest" nodes) on the ordering between two or more broadcast events. For example, if two different senders broadcast at approximately the same time and different recipients see the broadcasts in different order, then the protocol would result in some consensus ordering, where all honest nodes agree to consider the two events as happening in a particular order. When all non-malicious nodes see the events in the same order (e.g. if they happened far apart), then the consensus ordering would coincide with that. The protocol is capable of ordering any broadcast-based events, not just individual broadcasts (e.g., ordering "10 seconds after broadcasts A, B, and C were all received" vs "broadcast D was received").

The importance of such consensus ordering lies in it enabling the honest nodes to maintain a consistent global state without having to have any further coordination. As just one example, if all honest nodes start with an identical representation of some global state that they do not necessarily have direct visibility into, and each broadcast operation implies a particular change to that state, then making sure that all honest nodes agree on the order of such changes would be sufficient for them to maintain a consistent view of that global state without any further synchronization. Additional protocols could then take further advantage of this consistent global state. Examples of such a global state would include a distributed database, a distributed filesystem, and a distributed agreement on which nodes are malicious and to be ignored and/or isolated from the relevant network.

This protocol of the present disclosure was developed for at least the following scenario and can be implemented in a variety of applications, including shared states, sensor networks, etc. Thus, it should be understood that although a multi-party computation (MPC) protocol is described herein, it is used for illustrative purposes of one example embodiment and that the invention is not intended to be limited thereto. Suppose that the nodes perform some common tasks using a secure MPC protocol. At any point in time, a particular participant may detect that another participant is deviating from the protocol and is therefore malicious. At this point, a common approach in MPC implementations is for the party to broadcast a "dispute" message indicating that it is in dispute with the malicious party. A dispute message is some sort of a message from a party indicating that they have a dispute with another party, such as "[I have a] dispute with X". A typical network protocol would have a notion of a "header", where one field of the header would be designated as "message type", and a message body. An example implementation would send a message, where the message type field in the header would contain a numerical value assigned by the protocol designer to indicate the "dispute" message type, and the body would just be the identification of the node that the sender is in dispute with.

Note that a dispute message necessarily indicates that at least one party involved is malicious but does not necessarily indicate which one, as a malicious party could choose to broadcast a dispute message pointing to an honest one. However, once a single party P has a dispute with at least t+1 other parties, it is known that at least one of the t+1 must be honest (due to the threshold t assumption), and so P must be malicious. Since the broadcast disputes are seen by all participants, the fact that P must be malicious is known by all participants at this point and P is designated as "known malicious". As part of the MPC implementation, it is common to disallow a known malicious party to contribute to the MPC computation; in those steps of the computation where that party would have normally provided input, an empty (zero) input is used instead. This eliminates both the potential interference and potential delays due to trying to get an input from the malicious party. However, if a party P broadcasts a message M, the correctness of the MPC protocol would often require that either all honest parties accept the message M, or all honest parties replace M with empty/zero message—but in either case, it must be consistent. This raises the need for a consensus among the honest parties as to whether M was broadcast before or after P became known malicious. The present protocol addresses this issue and includes an additional property that it does not introduce any delays into the underlying MPC processing, except for a 1-time bounded delay every time a new entity becomes known malicious (which can only happen up to t times).

The system and method described herein provides a technological improvement in the field of distributed protocols and allows for a significant speedup in systems that need such consistency and can be used in a variety of applications. For example, the protocol of the present disclosure can be used to allow distributed vehicles/aircraft to efficiently submit jobs or otherwise communicate with distributed servers in a secure manner.

(4) Specific Details of Various Embodiments

As noted above, the present disclosure provides a system implementing a networking protocol for multiple nodes through consensus ordering of broadcast messages. Before describing the protocol in detail, it is helpful to provide a preliminary understanding of concepts associated with the present protocol. Further, provided below are also an overview of usage of the consensus ordering protocol, specifics of the consensus ordering protocol, a consensus broadcast reception protocol, and optimizations that can be implemented to improve performance for specific uses of the protocols. Each of these are described in turn and in further detail below.

(4.1) Concept Overview

The protocol applies to a network where each party can send a group message to all other parties (possibly including itself). While the terminology of "broadcast" is broadly used for such message transmissions, it also encompasses other related technologies, such as multicast. This protocol also applies to networks where the broadcast propagation delay (the time between the message is sent and the time it is received by all participants) is bounded. The maximal propagation delay of a broadcast is denoted herein as "T4". Further, "T6" is a predetermined time period and is denoted as a time period such that if a given node receives two broadcast messages more than a predetermined time period (i.e., T6) apart, it knows that all nodes received those messages in the same order. It is easy to see that T6 is at most 2*T4 (one could use 2*T4 for simplicity, but the use of a separate T6 constant allows for more generality and assists in explicitly describing the invention). As noted above, an assumption is made that the network has a broadcast-like operation. It is further assumed that, however that operation is implemented, the relevant timing properties are known. In particular, it is known how long it can take for such operation to complete, once initiated. In other words, the worst-case broadcast completion time is denoted as T4. This implies that if two broadcast messages (from potentially different senders) are received at least 2*T4 apart, then it is guaranteed that all the recipients will see the messages in the same order. It may be possible to determine a time constant smaller than 2*T4 that would still have such property.

Whatever the smallest known time period that has such a property is denoted as T6. Both are predetermined time periods constituting conservative estimates (conservative=can be larger than the potentially unknown true value, but cannot be smaller) of the worst-case timing properties of the broadcast implementation in the specific system. It is also easy to see that if the T6 bound holds for all broadcasts, then it also holds for events derived from broadcasts, such as:

1. "X became known malicious" that happens on each node when it receives "t+1"th dispute broadcasts for X (this is a derived event as different nodes see the dispute in different order and if, for example, more than t+1 nodes broadcast that they have a dispute with X, then honest nodes may receive the subset of the first t+1 disputes received at a particular node might not be the same across all nodes)
2. "Certain specific time have elapsed since a particular broadcast event"

(4.2) Overview of the Usage of the Consensus Ordering Protocol

The starting point for the consensus ordering protocol is that each node from a fixed set of nodes (each node knows what the set is) in a network receives the same broadcast messages in some order; subject to the T6 constraint that the order of the messages may differ from one receiver to another. The consensus ordering protocol that is at the heart of the present disclosure is executed by a larger system that incorporates such a protocol when there is a need for the larger system to "consistently" define an ordering between broadcast-derived events A and B.

Here, "consistently" means that the determination should be the same at all honest nodes. Note that this consistency would only be needed by such larger system when the ordering actually matters (for example, when both A and B are modifying the same portion of a global shared state, or when one of them is "X became known malicious" and the other is "X sent a broadcast" and there is a need to have an agreement on whether to accept the actual message sent by X, or to ignore X and accept 0 instead). To achieve this consistency the nodes would execute the consensus ordering protocol specified below. At the conclusion of the protocol each node outputs either "A consensus-before B", or "B consensus-before A" and the protocol guarantees that all honest nodes would output the same result regardless of the behavior of dishonest nodes. For example, a system implementing a secure MPC protocol could use this protocol as discussed above.

Another example could be a distributed file system or a distributed database ordering write/write or read/write races when they refer to the same data. Provided in further detail below are a pair of mutually interdependent algorithms; the consensus ordering protocol and the consensus broadcast reception protocol.

(4.3) Consensus Ordering Protocol

Figure 3:
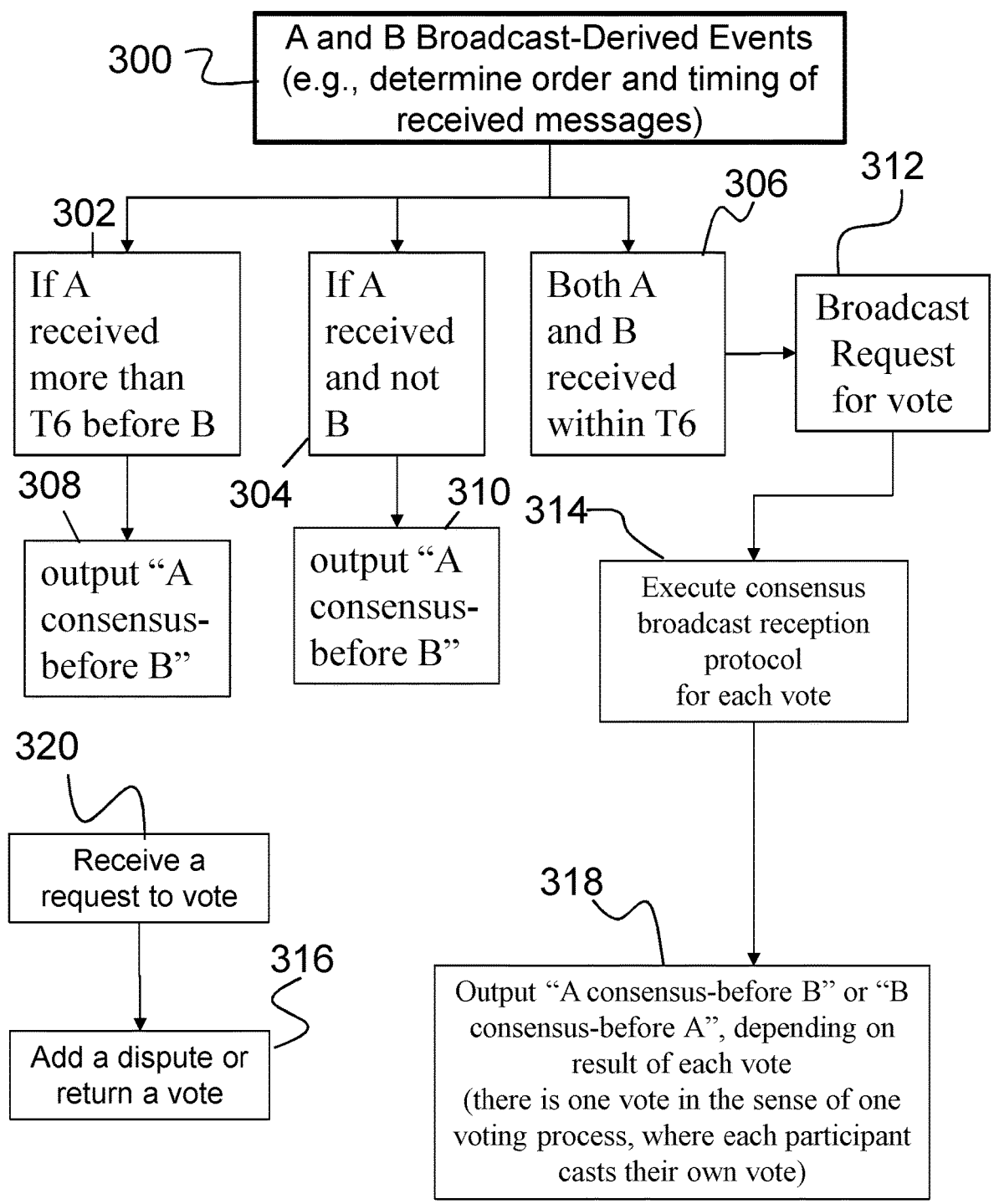
FIG. 3 is a flowchart illustrating a process for consensus ordering according to various aspects of the present invention.

When implementing the consensus ordering protocol and as shown in FIG. 3, the protocol begins through any broadcast-derived events 300 of A and B. For example, each honest node begins by determining an order and timing of receipt of at least two messages, A and B. Thereafter, each honest node executes the following steps:

1. If A received more than T6 before B 302: If the honest node saw A more than T6 before seeing B, then output

308 "A consensus-before B" (and similarly for "B consensus-before A"). For example, the protocol is executed after at least A and (in all cases other than 2) B were broadcast and received. These outputs are delivered to the larger system and then the larger system decides what the consequences of this are (the point is making sure that all honest nodes would arrive at the same answer).

2. If A received and not B 304: If it saw A, and has not seen B after waiting at least T6 after A, then output 310 "A consensus-before B" (and similarly for "B consensus-before A");
3. Both A and B received 306: If it saw both events within T6 of each other, then:
   i. Broadcast a request for vote 312;
   ii. Execute consensus broadcast reception protocol 314 described below to consensus-receive n votes, each being a number from 0 to 2 (vote of "0" is what gets received from known malicious nodes, vote of "1" designates a vote for "A before B", vote of "2" designates a vote for "B before A");
      1. If (# of 0s+# of "A after B" votes)<t+1, output "A consensus-before B" (and similarly for "B consensus-before A");
      2. If (# of 0s+# of "A after B" votes)>=t+1 and (# of 0s+# of "B after A" votes)>=t+1:
         a. Lemma (a property of this part of the consensus ordering protocol that makes it easier to see that the overall consensus ordering protocol has the desired property): If this happened (more generally—if there are honest votes on both sides), then all honest nodes have sent a request for vote;
         b. Arbitrary tie-breaking is OK here, as long as it is consistent across all honest nodes. (That is, the present disclosure describes a family of embodiments; any consistent method for tie-breaking at this step would be a workable embodiment of this invention);
         c. When the consensus ordering protocol is used as a part of the consensus broadcast reception protocol, the following is the desired tie breaking process: consider that the sender became known malicious "consensus-before" the message was received (that is, break ties towards all honest nodes deciding to receive 0 instead of the actual message from node that became known-malicious);
4. Receive Request to Vote 320 and Add a Dispute or Vote 316: After receiving a request to vote from any node (including a node that the user may be operating) before it became known malicious (locally before, not "before"):
   i. If at least one event (either A or B) is seen locally more than 2*T6 before receiving the request, add a dispute with requestor;
   ii. If at least one event (either A or B) still has not been seen locally more than T4 after receiving the request, add a dispute with requestor;
   iii. If at least one event is seen locally, send a vote for which of the two happened first;
      1. Lemma: will either see both events within T4, or within 2*T4+T6 the requestor would become designated as known malicious; and
   iv. After an appropriate timeout, add a dispute with any node that did not vote for a request from a node that is not known malicious by the time the timeout expired.
5. Output a Consensus Ordering 318: After each participant casts their own vote, the protocol distributes amongst the nodes a consensus ordering, such as "A consensus-before B" or "B consensus-before A", depending on result of each vote.

Note that Step 4 is a supporting step in that the other steps are directed to how a particular node decides its own output, while Step 4 is directed to helping other nodes make a decision which is an independent sequence as shown in FIG. 3. In Step 3ii, the protocol needs to wait until there are n votes. Of course, malicious nodes may refuse to vote, but if a node maliciously delays its vote too much, then it would result in: 1) A dispute being added with that node in Step 4.iv (unless there was already a dispute), 2) As each honest node gets to Step 4.iv, there will eventually be t+1 disputes (as there are at least t+1 honest nodes) disputes and the node would become known malicious (as discussed above), and 3) Now it becomes possible to replace the anticipated vote from the known malicious node with 0 (again, as discussed above), and that eventually brings the total number of votes to n.

(4.4) Consensus Broadcast Reception Protocol

Figure 4:
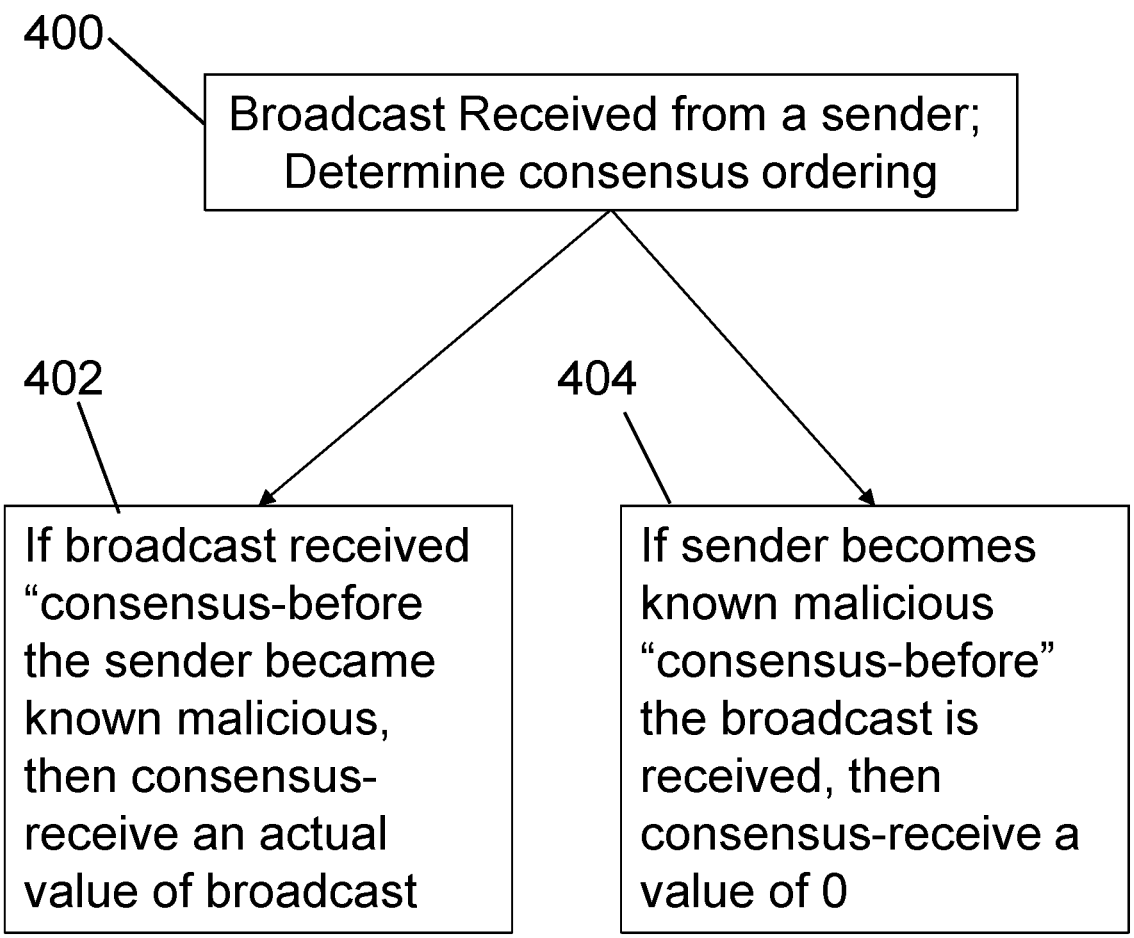
FIG. 4 is a flowchart illustrating a consensus broadcast reception protocol according to various aspects of the present invention.

The consensus broadcast reception protocol is used to guarantee that all nodes in the network consensus-receive the same value. In operation and as shown in FIG. 4, the consensus broadcast reception protocol process proceeds as follows:

1. Each time a network broadcast is received from a sender 400, utilize the consensus ordering between the time the broadcast is received and between the time the sender of the broadcast became known malicious (which is a broadcast derived event);
   i. 402: If network broadcast is received "consensus-before" the sender became known malicious, consensus-receive an actual value of that network broadcast, or
   ii. 404: If the sender node becomes known malicious "consensus-before" its network broadcast is received, consensus-receive a value of 0.

(4.5) Optimizations to Improve Performance for Specific Uses of the Protocols

The present disclosure also provides an alternative shifted consensus broadcast reception protocol that is optimized for use cases where the discovery of malicious nodes is a rare event. A rare event is case specific depending on the particular implementation and developer. As a non-limiting example, discovery of a malicious node more than Z (e.g., more than one time every month, etc.) could be pre-defined as a rare event. In such a scenario, the system implements the basic consensus broadcast reception protocol described above, replacing "sender became known malicious" with "T6 after the sender became known malicious".

By shifting the "uncertainty" period (the period where the reception of the network broadcast message would result in the consensus ordering protocol called by the consensus broadcast protocol being required to execute its voting step 3) from [−T6;T6] interval around the sender became known malicious to [0;2*T6] around it, the system allows all messages from senders that have not yet become known malicious to be processed right away. The "uncertainty" period is the period where the reception of the network broadcast message would result in the consensus ordering protocol called by the consensus broadcast protocol being required to execute its voting step 3 above. The cost of shifting the uncertainty period is doubling the length of period when the system may be willing to wait for and accept broadcasts from nodes that just became known malicious, before the network or system can start completely ignoring them (e.g., block broadcasts from the node, isolating broadcasts from the node for review only by an administrator node while terminating broadcasts to other nodes in the network).

Similarly, in the consensus ordering protocol, a helpful optimization is to use the consensus broadcast reception protocol shifted in the other direction. This would have the effect of being able to not take any votes from the known-malicious nodes, while having to wait 2*T6 before accepting any vote from a non-known-malicious node. The benefit is that this would limit unnecessary recursion (that is, the number of times the two protocols could end up recursively calling each other before any of them can be successfully completed)—any recursion would happen only if another node becomes known-malicious shortly after the initial one that triggered voting in the first place. To clarify the above, the recursion happens whenever the consensus ordering protocol calls the consensus broadcast reception protocol in step 3(ii), since that would in turn call the consensus ordering protocol.

Figure 5:
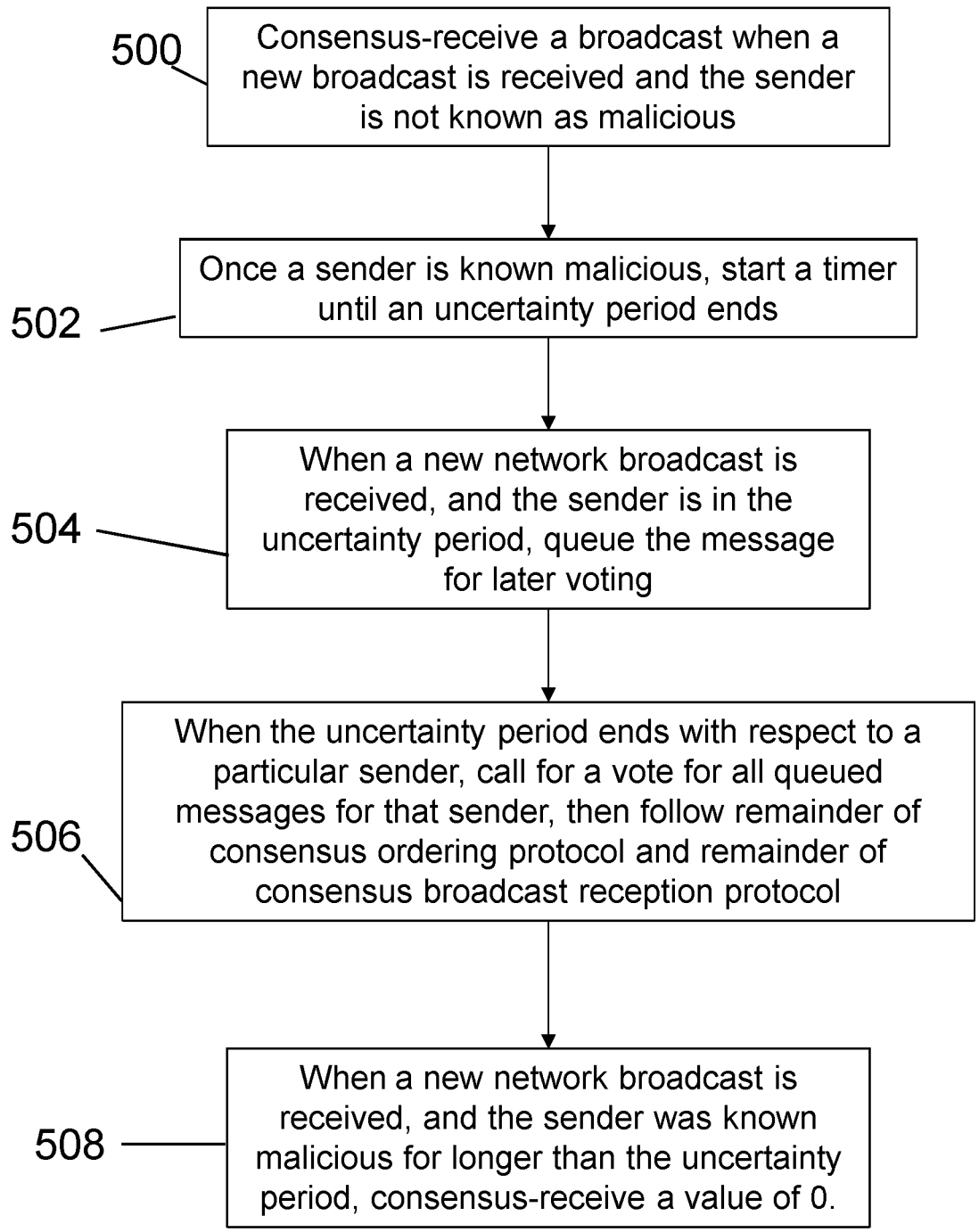
FIG. 5 is a flowchart illustrating a vote count protocol according to various aspects of the present invention.

Once the two above optimizations are taken, the final optimization is to batch the votes that the consensus ordering protocol takes in service of a consensus broadcast reception protocol, which results in the following optimized consensus broadcast protocol as shown in FIG. 5:

1. 500: When a new network broadcast is received, and the sender is not known malicious, consensus-receive it right away;
2. 502: Once a sender becomes known malicious, start a timer that proceeds until the uncertainty period (the period of time that starts when a sender becomes known malicious and ends 2×T6 after than) ends 2×T6 later;
3. 504: When a new network broadcast is received, and the sender is in the uncertainty period, queue the message for later voting;
4. 506: When the uncertainty period ends with respect to a particular sender, call for a vote for all queued messages for that sender (a single request for vote message could be used to call for votes for a range of messages), and follow the remainder of the consensus ordering protocol (Steps 3-4), and then the remainder of the consensus broadcast reception protocol (Steps 1(i)-1(ii)).
5. 508: When a new network broadcast is received, and the sender was known malicious for longer than the uncertainty period, consensus-receive a value of 0. (For example, if the message is a vote, "0", "1", and "2" are legitimate values, and in this case the vote from a known-malicious sender will be replaced with "0" regardless of what it actually was).

(4.6) Example Implementations

As can be understood by those skilled in the art, there are several applications in which the protocols described herein can be implemented. For example, if there are multiple redundant electronic control units in a vehicle (e.g., a car or in an airplane that receive data from the sensors), it is important for the control units to have a consistent view of the sensor data, so that their own state is consistent.

In this example, the control units can use this protocol to create a consensus ordering of sensor data, of decisions to consider a particular sensor faulty, and of decisions to consider one of the redundant controllers faulty. This allows the multiple control units to maintain the same view of the state of the overall system. In this example, if the control units have a consistent view that one of the sensors is faulty, the system could then isolate or otherwise stop receiving data from the relevant sensor (as it is deemed "malicious" in this context). As yet another example, if the control units have a consistent view that one of the redundant controllers is faulty, that particular faulty controller can be isolated or otherwise removed from communications with the remaining control units.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for consensus ordering of broadcast messages, the system comprising:
    a plurality of nodes in a network, each node having one or more processors and a memory, the memory being a non-transitory computer-readable medium having executable instructions encoded thereon, such that upon execution of the instructions, one or more nodes in the plurality of nodes perform operations of:
        agreeing on an order of two or more broadcast message derived events A and B on one or more networks;
            wherein if a node sees event A longer than a predetermined duration of time (T6) before seeing event B, then outputting "A consensus-before B" as a consensus broadcast ordering;
            wherein if the node sees the event A and not the event B after waiting at least T6, then outputting "A consensus-before B" as a consensus broadcast ordering;
            wherein if the node sees both events A and event B within T6, then:
                broadcasting a request for a vote on message ordering;
                executing a consensus broadcast reception protocol for the votes; and
                making an ordering decision based on the votes received;
        broadcasting a dispute message, such that the dispute message is transmitted by a first node to indicate that the first node accuses a second node of failing to follow protocol;
        designating a node in the network as a known malicious node, based on a number of other nodes with which the given node has disputes, wherein the known malicious node is a sensor in a network; and
        isolating the sensor from the network such that signals from the sensor are discarded by honest nodes in the network.

2. The system as set forth in claim 1, further comprising an operation of observing, by each node in the network, one or more broadcast message derived events, A and B, in some order, such that upon receipt, the system proceeds to perform the operation of agreeing on an order of two or more message derived events A and B.

3. The system as set forth in claim 2, wherein the consensus broadcast reception protocol is based on a consensus ordering between a time message derived event A is received and between either the time the sender of the message derived event A became known malicious, or an offset from such time, such that:
   if the message derived event A is received "consensus-before" the sender became known malicious, or an offset from such time, then consensus-receive amongst honest nodes an actual value of the message derived event A; or
   if the sender node becomes known malicious, or an offset from such time is "consensus-before" its network broadcast is received, then consensus-receive amongst the honest nodes a value of zero of the message derived event A.

4. The system as set forth in claim 1, wherein ordering of the two or more broadcast message derived events A and B modify a shared state, such that a consensus ordering protocols is used to maintain a consistent view of the shared state to ensure that whenever ordering of modifications could result in different end states, honest nodes are notified of which order to use.

5. A computer implemented method for consensus ordering of broadcast messages, the method comprising an act of causing one or more of a plurality of nodes in a network to execute instructions stored on a non-transitory computer readable medium, such that upon execution of the instructions, one or more nodes in the plurality of nodes perform operations of:
   agreeing on an order of two or more broadcast message derived events A and B on one or more networks;
      wherein if a node sees event A longer than a predetermined duration of time (T6) before seeing event B, then outputting "A consensus-before B" as a consensus broadcast ordering;
      wherein if the node sees the event A and not the event B after waiting at least T6, then outputting "A consensus-before B" as a consensus broadcast ordering;
      wherein if the node sees both events A and event B within T6, then:
         broadcasting a request for a vote on message ordering;
         executing a consensus broadcast reception protocol for the votes; and
         making an ordering decision based on the votes received;
   broadcasting a dispute message, such that the dispute message is transmitted by a first node to indicate that the first node accuses a second node of failing to follow protocol;
   designating a node in the network as a known malicious node, based on a number of other nodes with which the given node has disputes, wherein the known malicious node is a sensor in a network; and
   isolating the sensor from the network such that signals from the sensor are discarded by honest nodes in the network.

6. The method as set forth in claim 5, further comprising an operation of observing, by each node in the network, one or more broadcast message derived events, A and B, in some order, such that upon receipt, proceeding to perform the operation of agreeing on an order of two or more message derived events A and B.

7. The method as set forth in claim 6, wherein the consensus broadcast reception protocol is based on a consensus ordering between a time message derived event A is received and between either the time the sender of the message derived event A became known malicious, or an offset from such time, such that:
   if the message derived event A is received "consensus-before" the sender became known malicious, or an offset from such time, then consensus-receive amongst honest nodes an actual value of the message derived event A; or
   if the sender node becomes known malicious, or an offset from such time is "consensus-before" its network broadcast is received, then consensus-receive amongst the honest nodes a value of zero of the message derived event A.

8. The method as set forth in claim 5, wherein ordering of the two or more broadcast message derived events A and B modify a shared state, such that a consensus ordering protocols is used to maintain a consistent view of the shared state to ensure that whenever ordering of modifications could result in different end states, honest nodes are notified of which order to use.

9. A computer program product for consensus ordering of broadcast messages, the system comprising:
   a non-transitory computer-readable medium having executable instructions encoded thereon, such that upon execution of the instructions by one or more processors, the one or more processors cause one or more of a plurality of nodes in a network to perform operations of:
      agreeing on an order of two or more broadcast message derived events A and B on one or more networks;
         wherein if a node sees event A longer than a predetermined duration of time (T6) before seeing event B, then outputting "A consensus-before B" as a consensus broadcast ordering;
         wherein if the node sees the event A and not the event B after waiting at least T6, then outputting "A consensus-before B" as a consensus broadcast ordering;
         wherein if the node sees both events A and event B within T6, then:
            broadcasting a request for a vote on message ordering;
            executing a consensus broadcast reception protocol for the votes; and
            making an ordering decision based on the votes received;
      broadcasting a dispute message, such that the dispute message is transmitted by a first node to indicate that the first node accuses a second node of failing to follow protocol;
      designating a node in the network as a known malicious node, based on a number of other nodes with which the given node has disputes, wherein the known malicious node is a sensor in a network; and
      isolating the sensor from the network such that signals from the sensor are discarded by honest nodes in the network.

10. The computer program product as set forth in claim 9, further comprising instructions for causing an operation of observing, by each node in the network, one or more broadcast message derived events, A and B, in some order, such that upon receipt, proceeding to perform the operation of agreeing on an order of two or more message derived events A and B.

11. The computer program product as set forth in claim 10, wherein the consensus broadcast reception protocol is based on a consensus ordering between a time message derived event A is received and between either the time the sender of the message derived event A became known malicious, or an offset from such time, such that:
- if the message derived event A is received "consensus-before" the sender became known malicious, or an offset from such time, then consensus-receive amongst honest nodes an actual value of the message derived event A; or
- if the sender node becomes known malicious, or an offset from such time is "consensus-before" its network broadcast is received, then consensus-receive amongst the honest nodes a value of zero of the message derived event A.

12. The computer program product as set forth in claim 9, wherein ordering of the two or more broadcast message derived events A and B modify a shared state, such that a consensus ordering protocols is used to maintain a consistent view of the shared state to ensure that whenever ordering of modifications could result in different end states, honest nodes are notified of which order to use.

* * * * *